United States Patent [19]

Eley

[11] Patent Number: 4,823,057

[45] Date of Patent: Apr. 18, 1989

[54] VARIABLE SPEED MOTOR CONTROL

[75] Inventor: David L. Eley, Beloit, Wis.

[73] Assignee: Greenlee Textron Inc., Rockford, Ill.

[21] Appl. No.: 22,237

[22] Filed: Mar. 5, 1987

[51] Int. Cl.[4] .............................................. H02P 5/16
[52] U.S. Cl. ............................... 318/432; 318/345 D; 318/434
[58] Field of Search ............... 318/434, 432, 332, 345, 318/331, 345 G, 345 H, 345 C, 345 D

[56] References Cited

U.S. PATENT DOCUMENTS

| | | | |
|---|---|---|---|
| 3,510,743 | 5/1970 | Mortimer. | 318/332 |
| 3,517,290 | 6/1970 | Gunsser | 318/332 |
| 3,538,412 | 11/1970 | Graf et al. | 318/257 X |
| 3,584,282 | 6/1971 | Dow et al. | 318/332 |
| 3,683,253 | 8/1972 | Rummel | 318/331 |
| 3,955,130 | 5/1976 | Graf | 318/434 X |
| 4,096,422 | 6/1978 | Fleming et al. | 318/318 X |
| 4,097,787 | 6/1978 | Larsson et al. | 318/332 |
| 4,268,781 | 5/1981 | Kawada et al. | 318/332 X |
| 4,503,370 | 3/1985 | Cuneo | 318/345 D X |
| 4,574,226 | 3/1986 | Binder | 318/332 X |

Primary Examiner—Benjamin Dobeck
Attorney, Agent, or Firm—Richard A. Giangiorgi

[57] ABSTRACT

The motor control for a universal or D.C. electric motor controlled by opposing SCRs in parallel includes a comparator for controlling timing of firing of the SCRs based on a comparison of a sensed motor speed error signal and a synchronous ramp and also includes a circuit for sensing motor current as representative of motor torque and generating a motor shut-down signal when the sensed torque or current is greater than a setpoint value. When the shut-down signal is generated, the sensed speed error signal is overridden or prevented from being input to the comparator by deactivation (reverse biasing) of a current switch (diode) and results in the SCRs being deactivated. When the motor is restarted, a soft start circuit provides an alternate gradually increasing speed signal to the comparator in lieu of the sensed speed error signal for a selected short time after restart to gradually increase motor speed. After the selected time, the alternate speed signal itself reactivates the current switch (diode) by removing the reverse bias to allow the sensed speed error signal to again be input to the comparator to control motor speed. A novel integral differential amplifier is also provided as part of the speed error signal circuit.

15 Claims, 4 Drawing Sheets

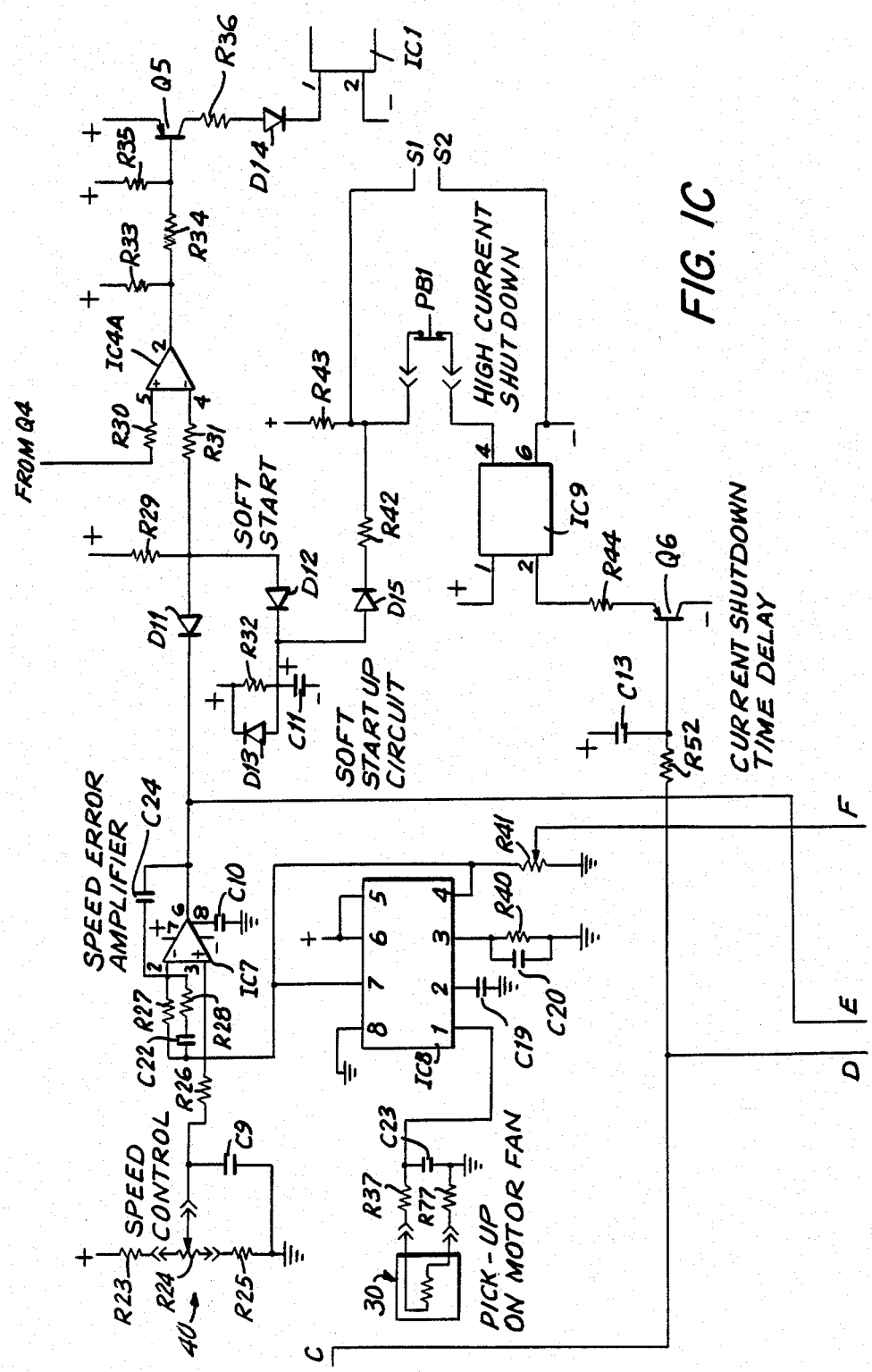
FIG. IC

VARIABLE SPEED MOTOR CONTROL

FIELD OF THE INVENTION

The invention relates to variable speed electric motor control, especially for a cable puller used to pull fiber optical or other cable through conduit during installation.

BACKGROUND OF THE INVENTION

With the advent of use of fiber optical cable as an information transmitting medium, there has been generated a need to install such fiber optical cables in lengths of conduit extending throughout buildings and between buildings. As compared to standard insulated copper or aluminum cable and even telephone wire installed in the past by cable pullers, fiber optical cable requires a more sophisticated puller in terms of having variable speed and having closer control of pull forces generated on the cable to minimize damage to the cable from pulling forces.

A motor speed control circuit for an appliance is disclosed in the Contri U.S. Pat. No. 4,326,153 issued Apr. 20, 1982. The patent provides a circuit for triggering a triac to pass current to the appliance motor when a synchronous ramp or sawtooth reference voltage is less than a speed error voltage, providing accurate timing of the switching point of the triac to control the motor.

The Gisske U.S. Pat. No. 4,568,864 issued Feb. 4, 1986, provides an electric motor control for a pipe or conduit bender wherein a logic system controls an SCR bridge system. The bridge system is supplied from A.C. mains through a bridge rectifier having three diodes and one SCR. For motor drive, this one SCR is made conducting to provide full-rectification, and for motor termination, this SCR is turned off to provide a half-wave rectifier that facilitates turn-off of the motor controlling SCR's.

The Plummer et al U.S. Pat. No. 4,555,093 issued Nov. 26, 1985, illustrates a cable pulling device having an ammeter calibrated to visually display cable pulling force in response to amperage drawn by the motor and a circuit breaker for interrupting power when motor over-load is approached.

SUMMARY OF THE INVENTION

The invention contemplates a variable speed electric motor control especially useful for controlling operation of a variable speed electric motor of a cable puller.

The invention further contemplates such a motor control having an adjustable automatic motor shut-down feature to deactivate the motor when a selected or desired pull force is exerted on the cable being pulled.

The invention also contemplates such a motor control circuit having a soft start feature providing for gradual increase in speed of the motor when the motor is reactivated after being shut-off by the operator after a pull or by the automatic motor shut-down feature.

The invention also contemplates such a motor control circuit wherein the soft start feature provides an alternate speed signal initially after reactivation of the motor to gradually increase motor speed and then is operative to reactivate the normal motor speed control circuit for controlling the motor thereafter.

In a typical working embodiment of the invention for a universal (A.C. or D.C.) motor, the motor control includes a synchronous ramp generator to generate synchronous ramp voltage signals and a speed error signal generator that senses and generates a D.C. voltage speed signal from, for example, a magnetic pick-up adjacent a moving motor component and, then generates a speed error signal by comparing the sensed speed signal to a preset speed setpoint. The speed error signal and synchronous ramp or sawtooth are fed to a voltage comparator so that the comparator can control firing or turn on time of the motor controlling SCR's. The motor shut down feature includes a current sensing system to sense motor current which is proportionate to motor output torque. The sensed motor current is converted to a full wave motor current signal that is compared to an adjustable setpoint. When the full wave motor current signal is greater than the setpoint, then the automatic motor shut-down feature is actuated through a current limit comparator. Typically, the signal from the current limit comparator, when sensed current exceeds the setpoint, actuates a transistor that trips a triac that, in turn, reverses biases the speed error signal current switch (diode) and overrides the sensed speed error signal to the voltage comparator. Overriding of the speed error signal to the comparator deactivates the SCR's to shut off the motor.

When the motor is restarted after operation of the automatic shut-down feature or after any turn off, a soft start circuit interfacing between the automatic shut-down circuit and speed error signal generator provides an alternate gradually increasing speed signal to the voltage comparator in lieu of the sensed speed error signal for comparison with the synchronous ramp. The voltage comparator in this mode provides a signal to the SCRs to gradually increase speed of the motor. When the alternate speed error signal reaches a certain upper value, a current switch (diode) overriding the sensed speed error signal is switched back on by the alternate speed signal to allow the sensed speed error signal to again be input to the voltage comparator to control the SCRs.

A novel integral differential amplifier for use in the speed error signal generating circuit includes a solid state amplifier having an input and output, a differentiating capacitor and resistor in series connected in parallel to the input to provide a differential input and an integrating capacitor connected to the differential input and output in parallel with the solid state amplifier.

BRIEF DESCRIPTION OF THE DRAWINGS

FIGS. 1A, 1B, 1C and 1D are schematics of parts of the motor control circuit of the invention. The overall control circuit is apparent by matching the reference letters A, B, C, D, F, on one figure with those letters on another figure.

DESCRIPTION OF PREFERRED EMBODIMENTS

Figure 1A:
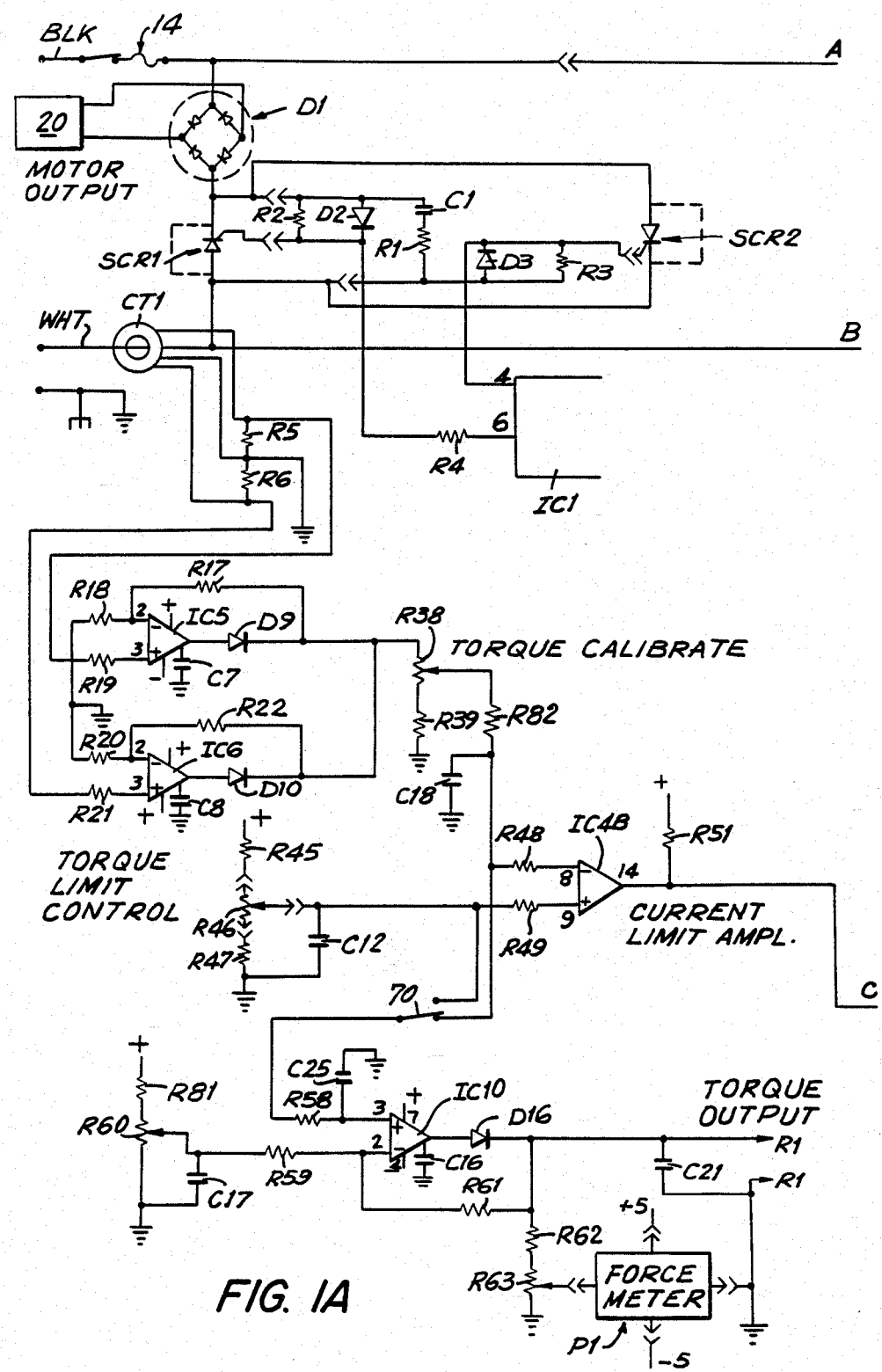
Figure 1B:
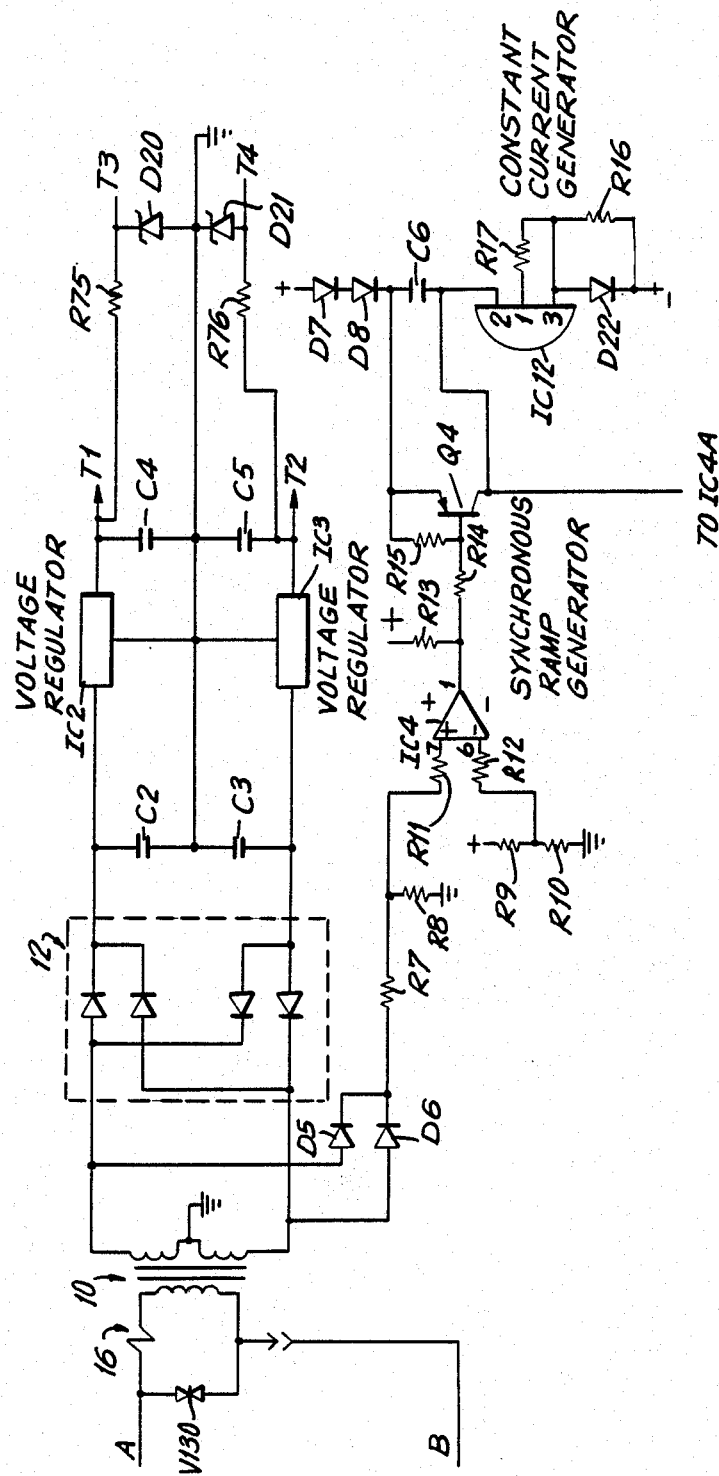
Figure 1D:
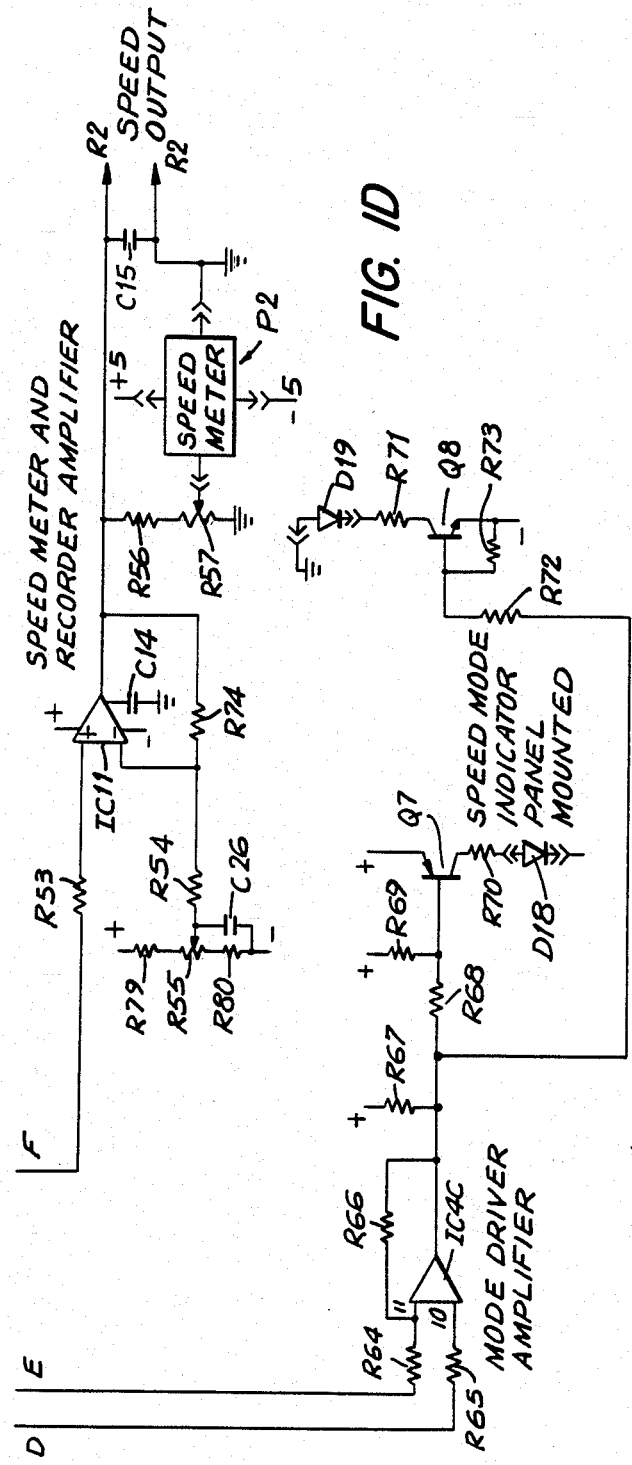

Referring to FIGS. 1A–1D, the power supply for the motor control of the invention is a standard type comprising a transformer 10, (Part No. TI-ST-3-28 available from Signal Corp.), a bridge rectifier 12, filter capacitors C2–C5 and voltage regulators IC2, IC3 (Part No. LM79L12 available from National Semiconductor Corp.).

A 10 amp circuit breaker 14 is disposed in the hot line BLK and 0.1 amp fuse 16 is provided to protect transformer 10. V130 represents a Gunn diode transient suppressor for protection on the supply or hot line.

The power supply outputs ±12 VDC at terminal T1, T2 and ±5 VDC at terminals T3, T4 to power the motor control and indicating meters (to be described), respectively. As is apparent resistors R75, R76 (both 6.8 Kohm) are used in conjunction with Zener diodes D20, D21 (both Part No. IN5231B from American Power Devices Corp.) to provide the ±5 VDC output at terminals T3, T4.

As shown, SCR1 and SCR2 (silicon controlled rectifiers) are opposed in parallel in neutral line WHT to motor 20 which is a commercially available universal type motor operable with A.C. or D.C. or a D.C. type motor. For example, a suitable motor is Part No. 5083003 available from Stature Electric Co.

SCR1 and SCR2 are actuated to fire or turn on by means of optocoupler IC1 (Part No. MOC 3011 from Motorola Corp.) via output terminals 4,6, respectively, of IC1. Capacitor C1 (0.22uf) and resistor R1 (10ohm) form a snubber to prevent false DV/DT SCR firing. Diodes D2 and D3 (both Part No. IN 4004) direct the firing signal from terminal 6,4 to SCR1 and SCR2, respectively. Resistors R2, R3 (both 1 Kohm) remove false firing problems from SCR1 and SCR2. Resistor R4 (330ohm) functions to limit current into the SCR gates to a safe or non-destructive value. Diode D1 (Part No. MOA 3506 from Motorola Corp.) rectifies the voltage to the motor 2 and improves motor efficiency.

Optocoupler IC1 and LED D 14 function to isolate the high voltage of SCR1 and SCR2 from the control circuitry to be described herebelow that inputs to other terminals of IC1.

A synchronous ramp generator is used to generate the timing signal to fire SCR1 and SCR2 at the correct time during the AC power sine wave. The synchronous ramp is generated across capacitor C6 (0.1uf) by applying a constant current through capacitor C6 with IC12 (Part No. LM344Z from National Semiconductor Corp.) being the constant current source. A constant current through C6 will generate a linearly changing (increasing) voltage with time. Capacitor C6 is then discharged at each zero crossing of the AC sine wave by bipolar transistor Q4 (Part No. 2N5087 from Motorola Corp.). When the AC sine wave picked up by diodes D5, D6 (both Part No. IN4148) is less than about 0.12 volts, voltage comparator IC4 (Part No. LM 339 from National Semiconductor Corp.) trips and turns on Q4 to discharge C6. Diodes D7, D8 (Part No. IN4148) are used to lower the maximum voltage of C6 into the common mode range of voltage comparator IC4 and to termperature compensate. Resistors R16 (4.75K) and R17 (475 ohm) set the current of IC12 such that the voltage across D6 changes about 23 volts in 8.3 milliseconds. Diode D22 (Part No. IN 4148) functions in combination with R16, R17 to provide the proper unidirectional constant current through C6 and also for temperature compensation.

Resistors R7 (5.6K) and R8 (10K) function to reduce peak input voltage to voltage comparator IC4 to a safe common mode level. Resistors R9 (100K) and R10 (1K) provide a reference signal for zero cross detection. Resistors R11 (100K) and R12 (110K) provide current limiting for the inputs of voltage comparator IC4.

Resistor R13 (10K) functions to provide a pullup current for the open collector output of IC4, Resistor R14 (100K) provides base current limiting for Q4 while resistor R15 (47K) provides base current drain for guaranteed shutoff of Q4.

The synchronous ramp generator described thus provides synchronous ramp or sawtooth voltage through resistor R30 (100K) to positive terminal 5 of voltage comparator IC4A (Part No. 1/4 LM 339).

A sensed motor speed error signal is provided to negative terminal 4 of IC4A by a speed signal generator that includes a magnetic speed pick-up 30 positioned adjacent the motor (20) cooling fan (not shown) having multiple fan blades as is known to output a pulse each time an individual fan blade passes adjacent the pick-up 30. This pulse signal is fed through filter components, resistor R37 (10K), R77 (10K) and capacitor C23 (0.1uf) to terminal 1 of IC8 (Part No. LM2907N-8 from National Semiconductor Corp.) which converts the pulses to a DC voltage speed signal which is fed to IC7, an error amplifier (Part No. LM308 from National Semiconductor Corp.).

Grounded capacitor C19 (0.001uf) is connected to terminal 2 of IC8 to provide frequency compensation to the error amplifier. Resistor R40 (270K) connected to terminal 3 and capacitor C19 (0.001uf) determine the rate of change of output voltage of IC8 with the rate of change of input frequency from the speed pickup 30. Capacitor C20 (1uf) removes the ripple from the output terminal 4 of IC8. Resistor R41 (10K) connected to terminal 4 provides an output for the speed meter to be described.

The solid state amplifier IC7 is made into an integral differential amplifier by providing capacitor C22 (0.1uf) and resistor R28 (1K) in series and connected in parallel with resistor R27 (15M) to provide a differential speed signal to negative terminal 2 of IC7. Integration of error of the speed signal over time is provided by capacitor C24 (0.01uf) connected to the differential signal input and output from terminal 6 parallel with the solid state amplifier IC7. Capacitor C10 (47PF) provides the frequency compensation for the amplifier.

At IC7, the sensed D.C. voltage signal received from IC8 is compared with the desired speed setpoint input to positive terminal 3 of IC7 and the amplifier outputs a speed error voltage signal from terminal 6 that will maintain the desired speed (setpoint speed). Any error in speed is integrated over time using capacitor C24 (0.01uf) until it is reduced to a very small value; e.g., less than 0.5%. The desired speed setpoint is input to IC7 by means of manual speed control 40 that includes resistor R23 (1.5K), resistor R24 (10K), resistor R25 (1.5K). Resistor R25 (1K) determines the minimum speed which the operator can set. Capacitor C9 (1uf) removes any noise which may be induced by outside sources or by the wiper of resistor R24 (10K) while it is being turned or moved for speed adjustment.

Rapid changes in motor speed (such as during motor start up) are accommodated by differentiating the speed signal with the setpoint speed using C22, R28 to allow for rapid speed correction. The speed error signal from IC7 is fed to negative terminal 4 of IC4A as mentioned above where the speed error voltage signal is compared with the synchronous ramp by IC4A to determine the correct time to turn on SCR1 and SCR2 controlling motor 20. The higher value of the speed error signal i.e., the higher that the voltage from IC7 is, the sooner SCR1 and SCR2 will be turned on by IC4A and the faster the motor 2 will run.

Resistor R33 (10K), resistor R34 (100K) bipolar transistor Q5 (Part No. 2N5087), resistor R36 (1.8K) and optocoupler IC1 referred to hereinabove control the gates of SCR2 and SCR1. Diode D14 (LED) couples IC4A with IC1.

Thus, motor speed is controlled by IC4A using the synchronous ramp input and speed error signal input from integral differential amplifier IC7.

The motor control of the invention provides an adjustable shut-off feature whereby an operator can select a maximum pulling force to which the cable being pulled will be subjected. This is especially advantageous when pulling fiber optical cable where it is desirable to limit pull force exerted thereon to a level that won't damage the cable. To this end the motor control includes a motor shut-down circuit to be described.

Since the current into motor 20 is proportional to its output torque, the motor shut-off feature includes a current sensing system that monitors the torque of the motor. In particular, motor current is sensed by a current transformer CT1 in the WHT line which outputs a signal to the precision rectifier. Resistors R5 (10) and R6 (10) function to provide the necessary load to the current transformer. Since the voltage from CT1 is so small (about 0.5 volts maximum), a silicon diode cannot rectify it. The precision rectifier is formed of IC5 (Part No. LM308), IC6 (Part No. LM308), resistor R17 (180K), resistor R18 (10K), resistor R19 (10K), resistor R20 (10K), resistor R21 (10K), resistor R22 (180K), diode D9 (Part No. IN4148) and diode D10 (Part No. IN4148) and amplifies the D.C. voltage signal from CT1 19 times and full wave rectifies the signal as well. Capacitors C7, C8 (47PF) function as described for capacitor C10.

The current signal from the precision rectifier is output to IC4B (Part No. ¼LM339), voltage comparator, through resistors R38 (5K) and R39 (4.7K) that are used for calibration purposes and through resistor R82 (10K) and capacitor C18 (10uf) that are used for filtering to smooth the D.C. signal voltage from the rectifier.

The sensed current signal is input to negative terminal 8 of IC4B through resistor R48 (100K).

A current or torque setpoint value is input to positive terminal 9 of IC4B from the adjustable torque limit control comprised of resistors R45 (43K), R46 (10K), R47 (10K) and capacitor C12 (0.1uf) through resistor R49 (100K) that establish the setpoint value.

The operator thereby can manually set the maximum motor torque and thus pull force exerted on the cable being pulled.

If the inputted sensed current signal from the precision rectifier is greater than the setpoint value, IC4B trips and, after a short time delay established by resistor R52 (56K) and capacitor C13 (10uf) for motor start-up, turns on bipolar transistor Q6 (Part No. MOC 3011).

Tripping of the triac in IC9 places a reverse voltage bias on diode D11 through which the speed error signal must pass to reach terminal 4 of comparator IC4A controlling SCR1 and SCR2. Of course, when this reverse voltage bias is applied, D11 becomes substantially non-conducting to the passage of the speed error signal therethrough, thereby interrupting input of the speed error signal to IC4A. The reverse biasing voltage is applied via pushbutton PB1, resistor 42 (1K), diode D15 (Part No. IN4148), diode 12 (Part No. IN4148) and the triac in IC9. The triac in IC9 is bistable and remains tripped until PB1 is pushed. The net result of reverse biasing D11 is that the negative terminal 4 of comparator IC4A is forced to about −11 volts which is near the minimum value to which the ramp generator goes. This prevents IC4A from tripping to fire or turn on SCR7 and SCR2 through IC1. The motor 20 is thus shut off when Q6 is tripped and trips the triac in IC9. Resistor R43 keeps the triac in IC9 in the tripped condition. And, the motor 20 will remain shut off until PB1 is pushed. Pushing of PB1 removes the holding current provided by R43 to the triac in IC9 and allows the triac in IC9 to return to its former non-conducting condition.

Thus, the cable being pulled will be protected against pulling forces exceeding the limit established by the torque limit control.

As mentioned above, to restart the motor 20, after auto shut down, PB1 must be pushed by the operator. When the motor is thusly restarted, soft start circuit of the inventive motor control initially is in control however. In particular, the soft start circuit includes diode D13 (Part No. IN4148) and resistor R32 (1M) in parallel and capacitor C11 (10uf) to provide a timing circuit that provides an alternative speed signal for input to negative terminal 4 of IC4A. This timing circuit provides a exponentially increasing voltage signal that initially is not sufficient to remove the reverse bias on D11 so that only the alternate speed signal reaches IC4A. This alternate speed signal causes tripping of the IC4A in a manner to provide a gradual increasing motor speed after PB1 is pushed. While D11 remains reversed biased and non-conducting, D12 is conducting to the alternate error signal so that the alternate speed signal passes to IC4A.

However, the alternate speed signal will increase with time until eventually it reaches a level to remove the reverse bias on D11 to make it conducting again to the sensed speed error signal from the integral differential amplifier IC7. D 12 then becomes non-conducting.

This same soft start effect is also achieved when the motor is turned on or restarted after power has been turned off by the operator. Slow acceleration of the motor will help prevent sudden shock loads to the cable being pulled.

In addition, the operator of the puller can connect a switch to terminals $S_1$, $S_2$ to stop the puller motor 20 without having to adjust the speed control setting.

The inventive motor control includes outputs for a force meter P1 and speed meter P2, respectively. As shown in the figures, speed meter P2 takes it signals (D.C. speed signal) from the resistor R41 while force meter P1 takes it signals from the precision rectifier through closed switch 70.

The signal to the force meter P1 is reduced 100 times by a resistor string, R62 (120K) and R63 (5K) and the signal to the speed meter P2 is reduced 100 times by a resistor string, R56 (120K) and R57 (5K). R63 and R67 are used to calibrate the meters P1 and P2, respectively.

For force meter P1, IC10 (Part No. LM308), resistor R58 (1M), resistor R59 (1M), resistor R61 (2.2M) and diode D16 (Part No. IN448) provide amplification of the signal from switch 70. Resistor R60 (10K) and R81 (10K) with capacitor C17 (1uf) provide motor tarr current removal. Diode D16 is provided such that when the motor is stopped (such as when the shutdown is tripped) and the motor tarr current is gone, the meters will read zero instead of some negative number. Switch 70 is provided such that activating it will cause the force meter P1 and the output R1 to read the desired setpoint.

Outputs R1 are provided to output a force or torque signal to a recorder (not shown).

Force meter P1 can be a commercially available meter (e.g., Part No. BL176201 from Modutec Inc.).

The speed meter circuit includes IC11 (Part No. LM308), resistor R53 (1M), resistor R54 (1M), resistor R74 (2.2M) for amplifying the D.C. speed signal from R41. A zero speed calibration for meter P2 is provided by resistor R79 (4.7K), resistor R55 (10K), resistor R80 (4.7K). Resistor R54 (1M), resistor R74 (2.2M) for amplifying the D.C. speed signal from R41.

Outputs R2 are provided to output a speed signal to a recorder (not shown).

Speed meter P2 can be a commercially available meter (e.g., Part No. BL176201 from Modutec).

Capacitors C14 and C16 function in the same manner as described for capacitor C10 above.

Capacitors C15 and C21 (both 1uf) function to prevent incoming transients from damaging the amplifier and filter any residual hum from the signal.

The control system also provides indicators visible to the operator indicating which system, normal speed control or motor shut-down, is controlling the motor 2. To this end, a mode driver amplifier IC4C (Part No. ¼LM339) is provided and receives an input signal at positive terminal 11 from the integral differential amplifier including IC7 and another input signal at negative terminal 10 from IC4B. In conjunction with resistors R64 (100K), R65 (100K) and R66 (2.2M), the mode driver amplifier IC4C either trips transistor Q7 or Q8 (both Part No. 2N5089) to light either light emitting diode D18 or D19, depending on whether the speed error or current signal is greater. Lighting of D18 indicates that error speed control system is controlling while lighting of D19 indicates automatic motor shut-down is controlling.

IC4C in the above circuit samples the current limit output from IC4B and the speed error output from the integral differential amplifier.

Resistors R70 (1K) and R71 (1K) function to limit the current into LED D18 and LED D19, respectively. Resistor R67 (10K) functions as a pullup resistor on IC4's open collector output. Resistor R68 (100K) serves as a current limiter in the base of Q7. Resistor R69 (47K) serves as a current drain from the base of Q7 to guarantee proper transistor shutoff. Resistor R72 (100K) functions as a current limiter into the base of Q8. Resistor R73 (47K) serves as a current drain from the base of Q8 to guarantee proper transition shutoff.

Along with the indicators described above, the motor control of the invention also includes a light emitting diode D24 to give a visual indication to the operator of the firing of SCR1 and SCR2. A brighter emission of D24 indicates that SCR1 and SCR2 are remaining turned on longer.

While certain preferred embodiments of the invention have been described in detail hereinabove, those familiar with this art will recognize that various modifications and changes can be made therein for practicing the invention as defined by the following claims.

I claim:

1. A variable speed motor control for an electric motor controlled by opposing SCRs, comprising means for controlling the SCRs by comparing a synchronous ramp and speed error signal, means for sensing motor current as representative of motor torque and providing a motor shut-down signal when sensed motor current exceeds a setpoint, and means for overriding the speed error signal in response to the motor shut-down signal for deactivating the SCRs.

2. The motor control of claim 1 wherein the means for controlling the SCRs includes (a) a synchronous ramp generator, (b) a speed signal generator for sensing motor speed and providing a sensed motor speed signal and having means for comparing the sensed motor speed signal to a setpoint and generating the speed error signal therefrom.

3. The motor control of claim 1 wherein the means for sensing motor current as representative of motor torque includes means for providing a sensed current signal and means for comparing the sensed current signal to a setpoint to provide the motor shut-down signal when the sensed current signal exceeds the setpoint.

4. The motor control of claim 1 wherein the overriding means comprises means responsive to the shut-down signal for interrupting the speed error signal.

5. The motor control of claim 4 wherein said responsive means for interrupting the speed error signal comprises a triac that trips in response to the shut-down signal and effects reversing biasing of a current switch diode through which the speed error signal must pass for comparison to the synchronous ramp.

6. A variable speed motor control for an electric motor controlled by opposing SCRs in parallel comprising:
   (a) a synchronous ramp generator for generating a synchronous ramp,
   (b) a speed signal generator for sensing motor speed and providing a speed error signal to maintain a desired motor speed,
   (c) a first comparator means for comparing the synchronous ramp and speed error signal for controlling timing of firing of the SCRs,
   (d) means for sensing motor current as representative of motor torque and providing a sensed current signal,
   (e) second comparator means for comparing the sensed current signal and a setpoint to provide a motor shut-down signal when the sensed current signal exceeds the setpoint,
   (f) means responsive to the motor shut-down signal for interrupting input of the speed error signal to the first comparator means,
   (g) means for deactivating the SCRs when the speed error signal is interrupted.

7. The motor control of claim 6 wherein the speed signal generator includes an integral differential amplifier for providing the speed error signal based on a sensed motor speed signal and setpoint for desired motor speed.

8. The motor control of claim 6 wherein the interrupting means comprises means responsive to the shut-down signal to reverse bias a first current switch to interrupt input of the speed error signal passing therethrough to the first comparator means.

9. The motor control of claim 8 further including means for providing an alternate speed signal to the first comparator means when the first current switch is reverse biased.

10. The motor control of claim 9 wherein the alternate speed signal providing means includes a second current switch biased to pass the alternate speed signal to the first comparator means and means for gradually increasing the alternate speed error signal over time to ultimately remove the reverse bias on the first current switch to allow the speed error signal to be input to the first comparator means.

11. A variable speed motor control for an electric motor controlled by opposing SCRs in parallel comprising:

(a) a synchronous ramp generator for generating a synchronous ramp, (b) a speed signal generator for sensing motor speed and providing a speed error signal to maintain a desired motor speed, (c) a first comparator means for comparing the synchronous ramp and speed error signal for controlling timing of firing of the SCRs, (d) means for sensing motor current as representative of motor torque and providing a sensed current signal, (e) second comparator means for comparing the sensed current signal and a setpoint to provide a motor shut-down signal when the sensed current signal exceeds the setpoint, (f) a first unidirectional current switch between the speed signal generator and first comparator means rendered non-conducting in response to the motor shut-down signal to interrupt inputting of the speed error signal to the first comparator means, (g) means for deactivating the SCRs when the speed error signal is interrupted, (h) means for providing an alternate speed signal to the first comparator means during a selected initial time after the SCRs are reactivated to provide a gradual rate of increase of motor speed by said SCRs and including a second unidirectional current switch rendered conducting to pass the alternate speed error signal while the first unidirectional current switch is non-conducting.

12. The motor control of claim 11 wherein the means for providing the alternate speed signal also includes means for generating an increasing alternate speed signal that causes the first unidirectional current switch to become conducting again to pass the speed error signal to the first comparator means and to render the second unidirectional current switch non-conducting.

13. A variable speed motor control for an electric motor controlled by opposing SCRs in parallel comprising:

(a) a synchronous ramp generator for generating a synchronous ramp, (b) a speed signal generator for sensing motor speed and providing a speed error signal to maintain a desired motor speed, (c) a first comparator means for comparing the synchronous ramp and speed error signal for controlling timing of firing of the SCRs, (d) means for sensing motor current as representative of motor torque and providing a sensed current signal, (e) second comparator means for comparing the sensed current signal and a setpoint to provide a motor shut-down signal when the sensed current signal exceeds the setpoint, (f) means responsive to the motor shut-down signal for interrupting input of the speed error signal to the first comparator means, (g) means for deactivating the SCRs when the speed error signal is interrupted, and (h) means for providing an alternate speed signal to the first comparator means in lieu of the speed error signal during a selected initial time after the SCRs are reactivated after being deactivated, to provide a gradual rate of increase of motor speed by the SCRs.

14. The motor control of claim 13 wherein the means for providing the alternate speed signal comprises a capacitor and means for passing a current through the capacitor to generate an increasing alternate speed signal.

15. A variable speed motor control for an electric motor controlled by opposing SCRs, comprising means for controlling the SCRs by comparing a synchronous ramp signal and speed error signal, means for sensing motor current as representative of motor torque and providing a motor shut-down signal when sensed motor current exceeds a setpoint, means for overriding the speed error signal in response to the motor shut-down signal for deactivating the SCRs, and means for providing an alternative speed signal for comparison with the synchronous ramp during a selected initial time after the SCRs are reactivated after being deactivated, to provide a gradual rate of increase of motor speed by the SCRs.

* * * * *